Figure 1:
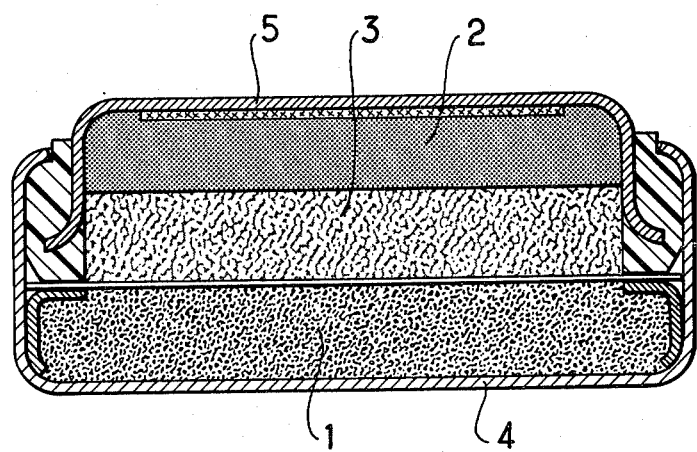

United States Patent [19]

Armand et al.

[11] 4,223,078
[45] Sep. 16, 1980

[54] LITHIUM ELECTRIC CELL

[75] Inventors: Michel Armand, Grenoble; Raymond Brec, Nantes; Alain Le Méhauté, Gif-sur-Yvette, all of France

[73] Assignee: Compagnie Generale d'Electricite, Paris, France

[21] Appl. No.: 24,142

[22] Filed: Mar. 26, 1979

[30] Foreign Application Priority Data

Mar. 24, 1978 [FR] France ............... 78 08662

[51] Int. Cl.$^2$ ............... H01M 6/16
[52] U.S. Cl. ............... 429/194; 429/221
[58] Field of Search ............... 429/194, 221

[56] References Cited

U.S. PATENT DOCUMENTS

| 4,049,879 | 9/1977 | Thompson et al. | 429/221 |
| 4,125,687 | 11/1978 | Salvo et al. | 429/194 |
| 4,143,217 | 3/1979 | Joo et al. | 429/221 |
| 4,144,383 | 3/1979 | Joo et al. | 429/221 |

OTHER PUBLICATIONS

Jacobson et al., New Iron Sulfur Cathodes for Nonaqueous Lithium Batteries, Journal of Electro. Chem. Soc. pp. 887–891, vol. 126, No. 6, 1979.

*Primary Examiner*—Donald L. Walton
*Attorney, Agent, or Firm*—Sughrue, Rothwell, Mion, Zinn and Macpeak

[57] ABSTRACT

A lithium electric cell. Said electric cell includes a positive electrode (1) and a negative electrode (2) in contact with a liquid electrolyte impregnates in a separator (3). The positive electrode comprising an active compound whose general formula is $Li_xFe_2S_z$ with x lying between 0 and 2, and z being not less than 3.

17 Claims, 3 Drawing Figures

LITHIUM ELECTRIC CELL

The present invention relates to a lithium cell with a liquid organic electrolyte.

A number of surveys have been made during the past three years concerning the electrochemical insertion, or, rather, "intercalation" of lithium in two-dimensional inorganic compounds; there should be cited in particular the work of M. S. Wittingham, disclosed in U.S. Pat. No. 4,049,879, as well as the surveys made by R. Brec and F. Le Mehaute, disclosed in French Pat. No. 77 045 18.

These authors describe in particular compounds such as $TiS_2$ and $NiPS_3$ installed in the charged state in an electric cell as well as compounds of the $Li_xTiS_2$ or $Ni_xPS_3$ type used in the discharged state.

However, it has been observed that such compounds, as well as a number of inorganic compounds cannot be directly synthesised by the dry method, since at their formation temperature, these compounds are not stable, but in contrast, they prove to be stable at ambient temperature.

Due to these considerations, research workers of Bell Telephone Laboratories have envisaged in particular stabilizing quadrivalent vanadium by producing $LiVS_2$ initially, followed by electrochemical oxidation to remove the lithium.

Such work has also been disclosed in the article "Cathodes for non-aqueous $VS_2$ based lithium batteries" on pages 825-850 of Vol 12 (1977) of the Material Research Bulletin.

The applicant has sought to produce new substances of high capacity and which remain stable even after a high number of charge/discharge cycles.

The present invention provides an electric cell which includes a positive electrode and a negative electrode in contact with a liquid electrolyte, said electric cell being characterized in that said positive electrode includes an active compound whose general formula is $Li_xFe_2S_z$ with x lying between 0 and 2 and z being not less than 3.

Figure 2:
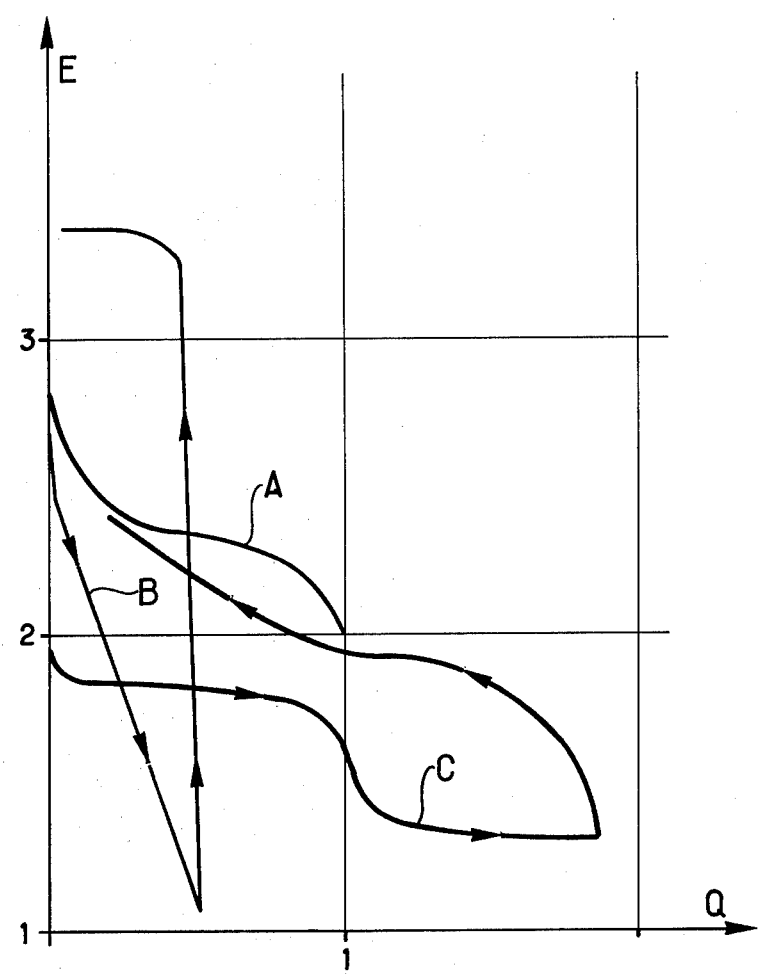
Figure 3:
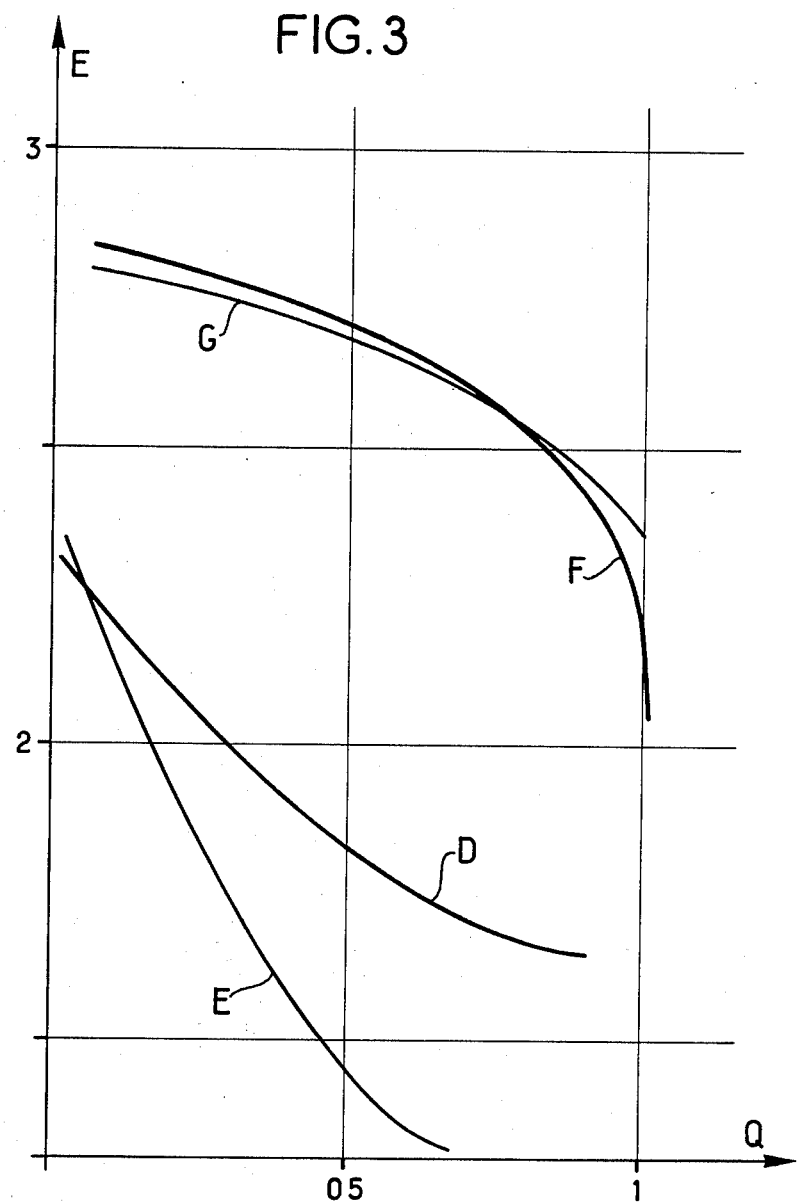

Examples of the invention are described by way of illustration with reference to the accompanying drawings and graphs in which:

FIG. 1 illustrates a button type electric cell in accordance with the invention; and FIGS. 2 and 3 are graphs which illustrate the electrical performance of electric cells in accordance with the invention.

The applicant has developed a new positive electrode for an electric cell with a lithium negative electrode.

For that purpose, the applicant has produced improved ternary compounds, in particular of lithium, iron and sulphur in which the iron has a value which lies between 2 and 3, it being possible for such a compound to acquire, by limited electrochemical oxidation, an oxido-reduction state greater by about 1 than the preceding state and having a stable or metastable state.

Such a compound is, in particular, $Li_2Fe_2S_3$.

The preparation method is as follows:

An intimate mixture of $Li_2CO_3$ and $Fe_2O_3$ is formed in stoichiometric proportions and is placed in an alumina boat which is placed in a quartz tube disposed in a furnace. The mixture is heated to a temperature of 800° C. while allowing argon which has bubbled through carbon bisulphide $CS_2$ to pass through the tube for about 6 hours.

The mixture of $CO_3Li_2$ and $Fe_2O_3$ is sulphurized by nascent sulphur which results from the decomposition of the carbon bisulphide and as shown in the following reactions:

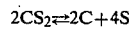

$$2CS_2 \rightleftharpoons 2C + 4S$$

$$Li_2CO_3 \rightarrow Li_2O + CO_2$$

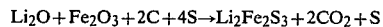

$$Li_2O + Fe_2O_3 + 2C + 4S \rightarrow Li_2Fe_2S_3 + 2CO_2 + S$$

The compound $Li_2Fe_2S_3$ can be determined quantitively by a spectro-photometric absorption method and its presence in the form of a single phase is revealed by its X-ray spectrum which is set out in the table hereinbelow:

| d (Å) | 6.210 | 3.370 | 3.120 | 3.010 | 2.952 | 2.669 | 2.296 | 2.050 | 1.951 |
|---|---|---|---|---|---|---|---|---|---|
| intensity | 1 | 1 | m | 1 | vl | m | m | H | 1 |
| d (Å) | 1.899 | 1.773 | 1.741 | 1.627 | 1.520 | 1.339 | 1.114 | 1.062 | |
| intensity | 1 | m | m | vl | vl | m | m | m | |

In the table,
1 represents a low intensity
vl represents a very low intensity
m represents a medium intensity
H represents a high intensity.

Further, the spectrum allows the complete lack of the sulphides $Li_2S$, $FeS$, $FeS_2$ to be detected. In other words, $Li_2Fe_2S_3$ actually corresponds to a specific single phase.

It will further be observed that if the operating conditions—in particular the temperature—are varied, it is possible to obtain different compounds with a general formula of $Li_2Fe_2S_z$ where $3 \leq z < 4$.

For example, for a temperature of 650°, the compound $Li_2Fe_2S_{3.5}$ is obtained. The temperature may be varied generally between 200° and 1000° C. As the applicant has observed, such compounds are not reducible in the charged state to $FeS$ or $FeS_2$. These substances are already used in electric cells.

In general, by a method similar to the one described above, it is possible to produce compounds whose general formula, as has been seen, is:

$$Li_xFe_2S_z$$

These previously described compounds can therefore be used in electric cells with an alkaline negative electrode, as will be described hereinafter.

The positive electrode

The positive electrode includes said compound $Li_xFe_2S_z$ and in particular $Li_2Fe_2S_z$. Further, it may include other materials necessary to ensure good electronic conductivity or good contact with the collector, namely, carbon, graphite, copper, nickel, iron or a transition element.

The negative electrode

The negative electrode includes an alkali metal and in particular lithium.

The collector must be made of metal which corrodes only slightly at the potential of the electrode.

By way of example, it would be possible to use an element in columns IVb, Vb, VIb, VIIb or VIII of the periodic table as well as copper, silver, zinc, aluminium or alloys thereof. Further, carbides, nitrides or borides of these compounds can be used.

The electrolyte

The electrolyte includes an organic solvent which is stable with respect to the positive electrode and the negative electrode and in which the salt of an alkali metal, in particular lithium, is dissolved.

More precisely, said solvent can be chosen from among propylene carbonate, dioxolane, dimethoxyethane, nitromethane, tetrahydrofurane and generally cyclic esters.

Said salt can be chosen from among perchlorates, hexafluoroborates, hexfluoroarseniates, nitrates, sulphates and methylchlorosulfonates.

With reference to FIG. 1, a practical embodiment will now be given of a button type electric cell in accordance with the invention.

FIG. 1 shows the positive active mass 1, the negative active mass 2 and a porous separator 3 impregnated with electrolyte. References 4 and 5 denote, respectively, the positive collector in the form of a cup and the negative collector in the form of a cap.

The positive active mass 1 (in the case, $Li_2Fe_2S_3$) is compressed at a pressure of 800 kg in the cup 4 in a dry nitrogen atmosphere.

The negative active mass 2 (in this case, lithium) is compressed in argon in the cap 5. The separator 3 is of the cellulose type and is impregnated with electrolyte formed by 1 M propylene carbonate in which lithium perchlorate is dissolved. After crimping, the electric cell thus constituted is charged for 80 hours at 200 $\mu A/cm^2$.

Since the weight of the active material is 66 mg, its capacity is about 8 mAh.

FIG. 2 which is a graph of the electromotive force E in volts as a function of the discharged capacity Q in grams equivalent, shows, by means of curves A, B and C, the chargedischarge cycles of the above-described electric cell, at various currents, namely, 100 $\mu A$ for cycle A, 780 $\mu A$ for cycle B and 100 $\mu A$ for cycle C.

In accordance with another embodiment, the positive mass 1 is $Li_2Fe_2S_{3.64}$ and the negative mass 2 is lithium, the electrolyte being the same as previously. The cell is charged at 200 $\mu A/cm^2$.

FIG. 3, which shows the same parameters as FIG. 2, gives the charge curve D and the discharge curve F of $Li_2Fe_2S_{3.64}$ and the charge curve E and the discharge curve G of $Li_2Fe_2S_3$.

In accordance with yet another embodiment, the positive active mass 1 includes 66% of $Li_2Fe_2S_3$ (or $Li_2Fe_2S_{3.64}$) and 33% of acetylene black, the negative electrode being lithium.

Contrary to the previous examples, the positive mass 1 is not compressed in the cup 4, but simply packed. In that case, less polarization is observed than in the preceding cases, the discharge voltage being stabilized at 2 volts at 200 $\mu A/cm^2$.

Analogous results are obtained by forming a latex with the positive active mass by adding a binding agent such as polytetrafluoroethylene.

We claim:

1. A electric cell which includes a positive electrode and a negative electrode in contact with a liquid electrolyte, said positive electrode including an active ternary compound of lithium, iron and sulfur whose general formula is $Li_x Fe_2S_z$ with x being not more than 2, and z being not less than 3.

2. An electric cell according to claim 1, wherein said active compound is $Li_2Fe_2S_z$.

3. An electric cell according to claim 2, wherein said active compound is $Li_2Fe_2S_3$.

4. An electric cell according to any of claim 1, claim 2 or claim 3, wherein said positive electrode further includes carbon, graphite, copper, nickel or iron.

5. An electric cell according to claim 1, claim 2 or claim 3, wherein the negative electrode comprises an alkali metal.

6. An electric cell according to claim 1, wherein said electrolyte includes an organic solvent in which a lithium salt is dissolved.

7. An electric cell according to claim 6, wherein said organic solvent is chosen from the group consisting of propylene carbonate, dioxolane, dimethyloxyethane, nitromethane, tetrahydrofurane and cyclic esters.

8. An electric cell according to claim 6, wherein that said salt is chosen from the group consisting of perchlorates, hexafluoroborates, hexafluoroarseniates, nitrates, sulphates and methylchlorosulfonates.

9. An electric cell according to claim 1, claim 2, or claim 3, wherein that the positive active compound is prepared by successively: mixing a carbonate of lithium and an oxide or iron; and heating the mixture to a temperature which lies between 200° and 1000° C. in a flow of inert gas;

10. An electric cell according to any of claim 1, claim 2 or claim 3, wherein said positive electrode further includes a transition element of the periodic table.

11. An electric cell according to claim 1, claim 2 or claim 3 wherein the negative electrode comprises lithium.

12. An electric cell according to claim 1, claim 2 or claim 3, wherein that the positive active compound is prepared by successively: mixing a carbonate of lithium and an oxide of iron; and heating the mixture to a temperature which lies between 200° and 1000° C. in a flow of inert gas, said inert gas being argon containing a compound of carbon and sulphur.

13. An electric cell according to claim 2, wherein said electrolyte includes an organic solvent in which a lithium salt is dissolved.

14. An electric cell according to claim 13, wherein said organic solvent is chosen from the group consisting of propylene carbonate, dioxolane, dimethyloxyethane, nitromethane, tetrahydrofurane and cyclic esters.

15. An electric cell according to claim 13, wherein that said salt is chosen from the group consisting of perchlorates, hexafluoroborates, hexafluoroarseniates, nitrates, sulphates and methylchlorosulfonates.

16. An electric cell according to claim 3, wherein said electrolyte includes an organic solvent in which a lithium salt is dissolved.

17. An electric cell according to claim 16, wherein said organic solvent is chosen from the group consisting of propylene carbonate, dioxolane, dimethyloxyethane, nitromethane, tetrahydrofurane and cyclic esters.

* * * * *